United States Patent
Matsuzaki et al.

(10) Patent No.: US 10,788,821 B2
(45) Date of Patent: Sep. 29, 2020

(54) WIRELESS MANAGEMENT SYSTEM FOR WORK VEHICLES AND METHOD FOR MANAGING WORK VEHICLES IN WIRELESS MANAGEMENT SYSTEM

(71) Applicant: Kubota Corporation, Osaka (JP)

(72) Inventors: Yushi Matsuzaki, Sakai (JP); Kenichi Iwami, Sakai (JP); Yasuhisa Uoya, Amagasaki (JP)

(73) Assignee: KUBOTA CORPORATION, Osaka-Shi (JP)

( * ) Notice: Subject to any disclaimer, the term of this patent is extended or adjusted under 35 U.S.C. 154(b) by 490 days.

(21) Appl. No.: 15/847,934

(22) Filed: Dec. 20, 2017

(65) Prior Publication Data

US 2018/0210440 A1 Jul. 26, 2018

(30) Foreign Application Priority Data

Jan. 23, 2017 (JP) .................... 2017-009639

(51) Int. Cl.
*H04L 29/08* (2006.01)
*G05D 1/00* (2006.01)
(Continued)

(52) U.S. Cl.
CPC ......... *G05D 1/0011* (2013.01); *G05D 1/0022* (2013.01); *G05D 1/0027* (2013.01);
(Continued)

(58) Field of Classification Search
CPC .. G05D 1/0253; G05D 1/0011; G05D 1/0022; G05D 1/0027; G05D 1/021; G05D 1/0276; G05D 1/0278; G05D 1/0295; G05D 2201/0201; H04L 67/12; H04L 1/0015; H04L 1/0025; H04L 5/0005; H04L 5/0064; H04W 72/0453; H04W 72/085; H04W 84/20; A01B 69/008; G08C 17/02; H04B 17/318

See application file for complete search history.

(56) References Cited

U.S. PATENT DOCUMENTS

| | | | | |
|---|---|---|---|---|
| 6,741,841 | B1 * | 5/2004 | Mitchell | H04B 7/18508 455/188.1 |
| 8,099,106 | B2 * | 1/2012 | Soliman | G01S 5/0252 455/456.3 |

(Continued)

FOREIGN PATENT DOCUMENTS

| | | |
|---|---|---|
| JP | 2014-178759 | 9/2014 |
| JP | 2014-192740 | 10/2014 |

*Primary Examiner* — Wutchung Chu
(74) *Attorney, Agent, or Firm* — Mori & Ward, LLP

(57) ABSTRACT

A wireless management system for work vehicles includes a first communication device and a second communication device. The first communication device is configured to perform wireless communication in frequency bands to control the work vehicles. The second communication device is configured to perform the wireless communication with the first communication device. The first communication device and the second communication device are configured to select a frequency band from the frequency bands based on wireless transmission data in order to perform the wireless communication for the wireless transmission data in the frequency band.

9 Claims, 7 Drawing Sheets

(51) Int. Cl.
  *G05D 1/02* (2020.01)
  *H04W 84/20* (2009.01)
  *H04L 5/00* (2006.01)
  *A01B 69/04* (2006.01)
  *H04B 17/318* (2015.01)
  *H04L 1/00* (2006.01)
  *G08C 17/02* (2006.01)

(52) U.S. Cl.
  CPC ............ G05D 1/021 (2013.01); G05D 1/0295 (2013.01); H04L 67/12 (2013.01); *A01B 69/008* (2013.01); *G05D 2201/0201* (2013.01); *G08C 17/02* (2013.01); *H04B 17/318* (2015.01); *H04L 1/0015* (2013.01); *H04L 1/0025* (2013.01); *H04L 5/0005* (2013.01); *H04L 5/0064* (2013.01); *H04W 84/20* (2013.01)

(56) References Cited

U.S. PATENT DOCUMENTS

| | | | | |
|---|---|---|---|---|
| 8,908,573 | B1* | 12/2014 | Wang | H04L 1/0026 370/280 |
| 9,456,239 | B2* | 9/2016 | Ikeda | H04W 4/026 |
| 9,711,851 | B1* | 7/2017 | Cesarano | B64C 39/024 |
| 9,930,567 | B1* | 3/2018 | Beard | H04B 1/713 |
| 9,979,531 | B2* | 5/2018 | Schwent | H04B 1/0057 |
| 10,361,816 | B2* | 7/2019 | Sakai | H04L 1/0057 |
| 2003/0164794 | A1* | 9/2003 | Haynes | H04B 1/7172 342/353 |
| 2003/0221010 | A1* | 11/2003 | Yoneya | G06F 16/58 709/227 |
| 2005/0143874 | A1* | 6/2005 | Peltz | B61L 25/028 701/19 |
| 2008/0200121 | A1* | 8/2008 | Yamamoto | H04W 84/005 455/41.2 |
| 2009/0150942 | A1* | 6/2009 | Nakano | H04L 47/70 725/75 |
| 2010/0167721 | A1* | 7/2010 | Madhavan | H04M 1/6075 455/426.1 |
| 2011/0211625 | A1* | 9/2011 | Birmingham | H04M 11/066 375/222 |
| 2014/0086208 | A1* | 3/2014 | Murray | H04W 72/0406 370/331 |
| 2014/0185498 | A1* | 7/2014 | Schwent | H04L 5/02 370/297 |
| 2014/0277899 | A1 | 9/2014 | Matsuzaki et al. | |
| 2015/0210387 | A1* | 7/2015 | Ling | G05D 1/0022 701/2 |
| 2015/0296243 | A1* | 10/2015 | Ikeda | H04N 21/214 725/75 |
| 2015/0318913 | A1* | 11/2015 | Lauer | H04W 28/0268 455/431 |
| 2016/0097853 | A1* | 4/2016 | Kamo | G01S 13/584 342/70 |
| 2017/0177002 | A1* | 6/2017 | Ogura | A01B 69/008 |
| 2017/0250784 | A1* | 8/2017 | Sakai | H04L 1/08 |
| 2018/0020362 | A1* | 1/2018 | Kawasaki | H04W 72/0453 |
| 2018/0130347 | A1* | 5/2018 | Ricci | G08G 1/0112 |
| 2018/0299881 | A1* | 10/2018 | Yoo | H04B 7/18508 |
| 2018/0359393 | A1* | 12/2018 | Kawasaki | H04N 7/18 |
| 2020/0137723 | A1* | 4/2020 | Zhou | H04W 24/02 |

* cited by examiner

WIRELESS MANAGEMENT SYSTEM FOR WORK VEHICLES AND METHOD FOR MANAGING WORK VEHICLES IN WIRELESS MANAGEMENT SYSTEM

CROSS-REFERENCE TO RELATED APPLICATIONS

The present application claims priority under 35 U.S.C. § 119 to Japanese Patent Application No. 2017-009639, filed Jan. 23, 2017. The contents of this application are incorporated herein by reference in their entirety.

BACKGROUND OF THE INVENTION

Field of the Invention

The present invention relates to a wireless management system for work vehicles and a method for managing work vehicles in a wireless management system.

Discussion of the Background

Recently, a work vehicle includes a wireless communication device, and can exchange information with an external communication device through a wireless communication network. Particularly, an automatically traveling work vehicle receives various control commands related to work traveling from another work vehicle or a remote control device brought by a manager, and performs control operation based on the received control command.

For example, in the work vehicle operation system disclosed in Japanese Patent Application Laid-open No. 2014-192740, the work vehicle is provided with a control module that outputs a control signal controlling an operation device by operating an operation device, and a portable information terminal serving as the remote control device includes a display that can display a pseudo operation device corresponding to the operation device of the work vehicle and a remote control unit that generates a remote control signal based on operation input to the pseudo operation device. By operating the pseudo operation device, the user can issue an operation command similar to that for operating the actual operation device to the work vehicle, and remotely control the operation of the work vehicle.

Japanese Patent Application Laid-open No. 2014-178759 discloses a work vehicle cooperative system that performs ground work with a master work vehicle and an unmanned steerable slave work vehicle following the master work vehicle. In the system, the manned-navigation type master work vehicle and the unmanned-navigation type slave work vehicle following the master work vehicle perform the ground work in a reciprocating straight traveling in which the straight traveling and the U-turn traveling are repeated. At this point, work traveling target positional data of the slave work vehicle is calculated in consideration of master traveling locus data, master-machine-to-ground work width data, and slave-machine-to-ground work width data, which are calculated from master-machine positional data indicating the position of the master work vehicle. The calculated work traveling target positional data is wirelessly transmitted to the slave work vehicle. The received work traveling target positional data becomes a navigation control target value, and the slave work vehicle is navigated in an unmanned manner.

SUMMARY OF THE INVENTION

According to one aspect of the present invention, a wireless management system for work vehicles includes a first communication device and a second communication device. The first communication device is configured to perform wireless communication in frequency bands to control the work vehicles. The second communication device is configured to perform the wireless communication with the first communication device. The first communication device and the second communication device are configured to select a frequency band from the frequency bands based on wireless transmission data in order to perform the wireless communication for the wireless transmission data in the frequency band.

According to another aspect of the present invention, a wireless management system for work vehicles includes first communication means and second communication means. The first communication means are for performing wireless communication in frequency bands to control the work vehicles. The second communication means are for performing the wireless communication with the first communication means. The first communication means and the second communication means are configured to select a frequency band from the frequency bands in accordance with wireless transmission data in order to perform the wireless communication for the wireless transmission data in the frequency band.

According to another aspect of the present invention, a method for managing work vehicles in a wireless management system includes performing wireless communication in frequency bands to control the work vehicles. A frequency band is selected from the frequency bands in accordance with wireless transmission data in order to perform the wireless communication for the wireless transmission data in the frequency band.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
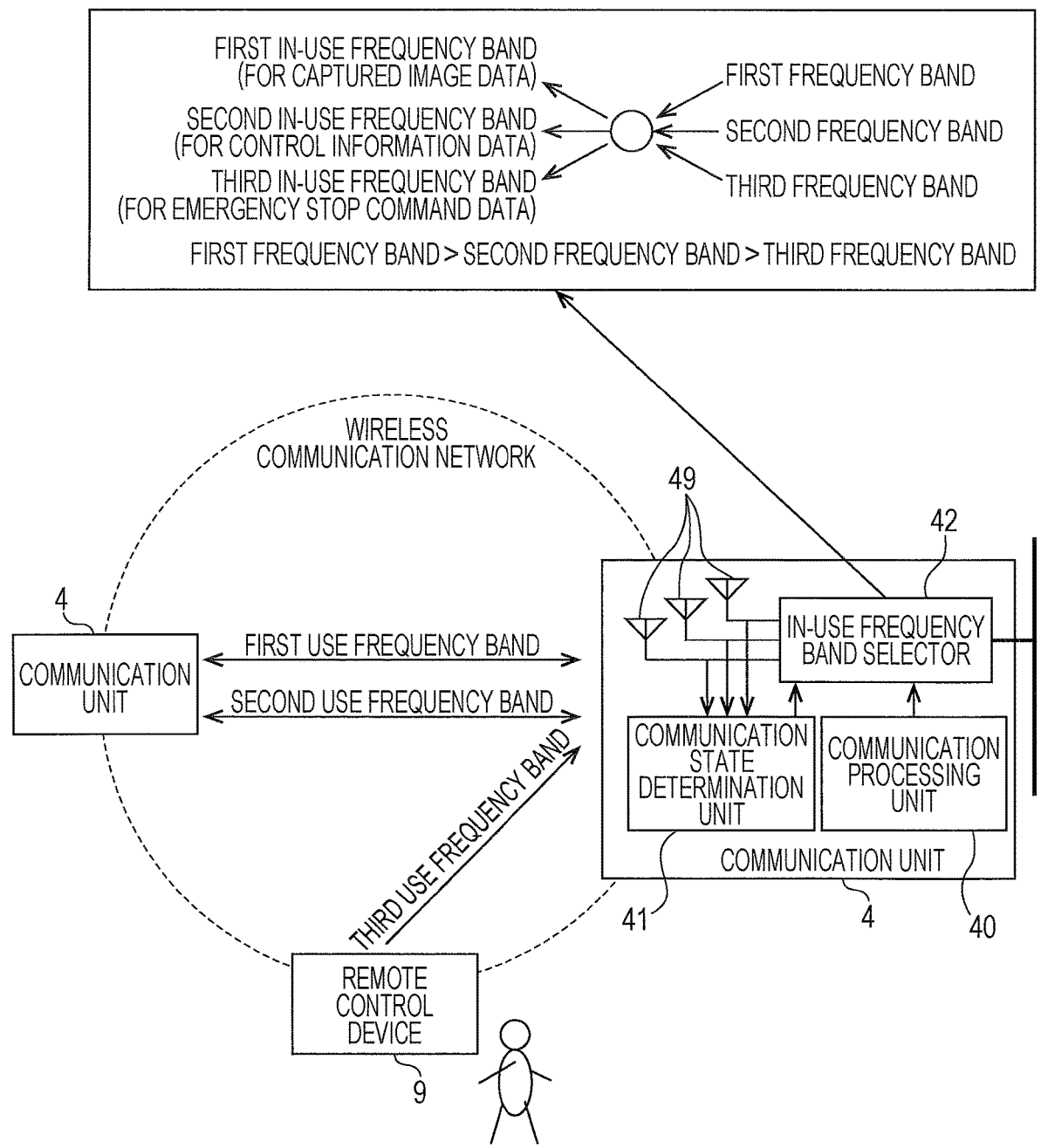
FIG. 1 is an explanatory diagram illustrating a basic configuration of a work vehicle wireless management system according to an exemplary embodiment.

The embodiments will now be described with reference to the accompanying drawings, wherein like reference numerals designate corresponding or identical elements throughout the various drawings.

A work vehicle wireless management system according to an exemplary embodiment of the present invention will be described below with reference to the drawings. FIG. 1 illustrates a basic configuration of the work vehicle wireless management system. A wireless communication network of the work vehicle wireless management system includes a communication unit (a communication device) 4 installed in each of two work vehicles and a remote control device 9 carried by an observer. Frequency bands handled in the wireless communication network include a first frequency band, a second frequency band, and a third frequency band. The first frequency band is the highest band, the second frequency band is the second highest band, and the third frequency band is the lowest band. Each frequency band is publicly regulated, the first frequency band is a 2.4-GHz band, the second frequency band is a 920-MHz band, and the third frequency band is a 429-MHz band. Other bands may be used.

A type of wireless transmission data dealt with by the wireless communication network of the exemplary embodiment is captured image data regarding the surroundings of the work vehicle, control information data related to the traveling work of the work vehicle, and an emergency stop command for emergency stop of the work vehicle. In principle, the frequency band used to wirelessly transmit the captured image data is referred to as a first in-use frequency band, the frequency band used to wirelessly transmit the control information data is referred to as a second in-use frequency band, and the frequency band used to wirelessly transmit the emergency stop command is referred to as a third in-use frequency band.

The communication unit 4 includes a communication processing unit (communication processing circuitry) 40, a communication state determination unit (communication state determination circuitry) 41, and an in-use frequency band selector (frequency band selecting circuitry) 42. The communication processing unit 40 converts input data into a form that can be wirelessly transmitted, and converts the received wireless transmission data into a necessary form and outputting the wireless transmission data having the necessary form. The communication state determination unit 41 determines a communication state in the first frequency band, the second frequency band, and the third frequency band. When the communication state is determined using a reception signal intensity, intensity of an input signal from an antenna 49 is measured. A determination that the communication state is good is made when the measured intensity is equal to or greater than a threshold, and a determination that the communication state is poor is made when the measured intensity is below the threshold. When the communication state determination unit 41 determines the communication state using a beacon signal check, each communication unit 4 periodically transmits a beacon signal, the communication state determination unit 41 determines that the communication state is good by the successful reception of the beacon signal, and the communication state determination unit 41 determines that the communication state is poor by reception failure of the beacon signal.

The in-use frequency band selector 42 selects a frequency band (that is, the first in-use frequency band) used for the captured image data, a frequency band (that is, the second in-use frequency band) used for the wireless transmission of the control information data, and a frequency band (that is, the third in-use frequency band) used for the wireless transmission of the emergency stop command, based on the communication state determined by the communication state determination unit 41.

When all the reception states of the first, second, and third frequency bands are good, the first frequency band is allocated to the first in-use frequency band as an initial setting, the second frequency band is allocated to the second in-use frequency band as the initial setting, and the third frequency band is allocated to the third in-use frequency band as the initial setting.

When the reception state of one of the first, second, and third frequency bands is poor, the following emergency stop notification process can be arbitrarily used.

(1) When the communication state of the first frequency band is determined to be poor, and when the communication state of the second frequency band is determined to be good, the captured image data in which the first frequency band is allocated as the first in-use frequency band is wirelessly transmitted using the second in-use frequency band together with the control information data. At this point, preferably the captured image data is converted into not moving image data but still image data to reduce a data amount. Similarly, when the communication state of the second frequency band is determined to be poor, and when the communication state of the first frequency band is determined to be good, the control information data in which the second frequency band is allocated as the second in-use frequency band is wirelessly transmitted using the first in-use frequency band together with the captured image data.

(2) When the communication state of the third frequency band is determined to be poor, and when the communication state of the first or second frequency band is determined to be good, the emergency stop command in which the third frequency band is allocated as the third in-use frequency band is wirelessly transmitted with the first or second frequency band as the third in-use frequency band.

(3) When the communication state of the third frequency band is determined to be poor, there is a possibility that the emergency stop command cannot be wirelessly transmitted, so that the work vehicle is forcedly stopped.

(4) When one of the first, second, and third frequency band is determined to be poor, the work vehicle is forcedly stopped for the moment.

When an available capacity of a data transmission capacity is generated in at least one of the first, second, and third in-use frequency bands, particularly when the available capacity of the data transmission capacity is generated in the first or second in-use frequency band, duplicate transmission is performed using the in-use frequency band in which the available capacity of the control information data or the captured image data is generated.

A system, in which the communication unit 4 is mounted on a manually traveling manned work vehicle and an automatically traveling unmanned work vehicle while the remote control device is carried by a user who is out of the work vehicles, will be described below as a specific application example of the work vehicle wireless management system in FIG. 1.

Figure 2:
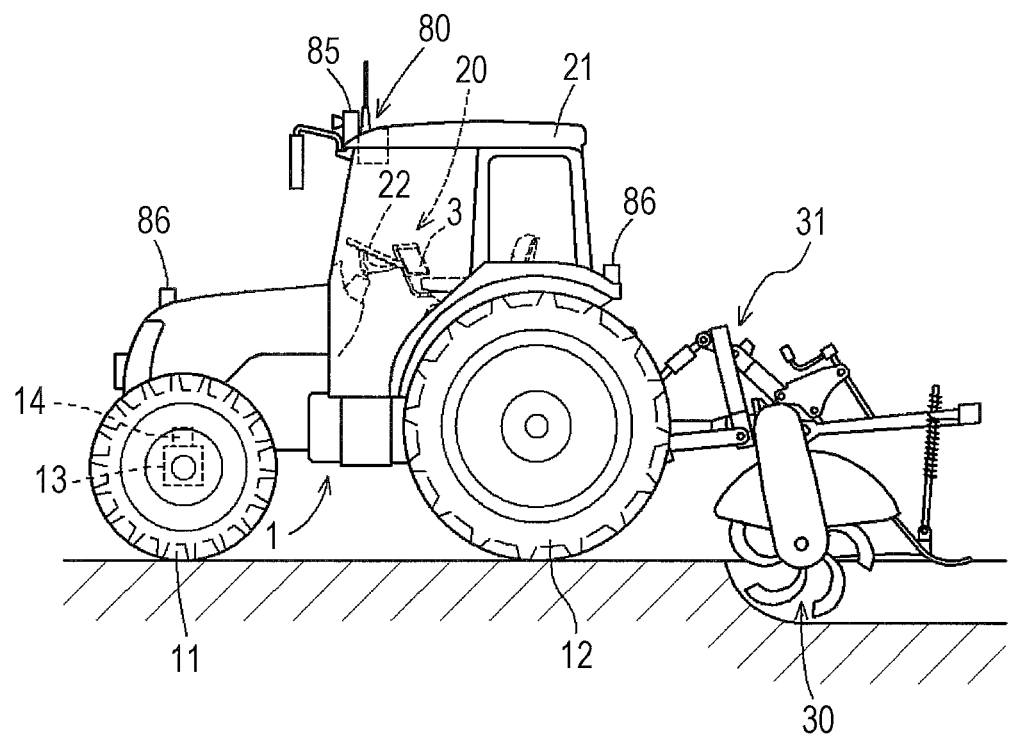
FIG. 2 is a side view of a tractor as an example of a work machine in which the work vehicle wireless management system is used.

FIG. 2 illustrates a tractor as an example of a work vehicle that participates in the work vehicle wireless management system. In the tractor, a steering section 20 is provided in a central portion of a vehicle body 1 supported by front wheels 11 and rear wheels 12. A work device 30 that is a rotary tilling device is mounted on a rear portion of the vehicle body 1 while a hydraulic lifting mechanism 31 is interposed therebetween. The front wheels 11 act as a steering wheel, and a steering angle is changed by a steering mechanism 13, thereby changing the traveling direction of the tractor. The steering angle of the front wheel 11 is changed by operation of the steering mechanism 13. The steering mechanism 13 includes a steering motor 14 for automatic steering. During manual traveling, the front wheels 11 can be steered by operating a steering wheel 22 disposed in the steering section 20. A general-purpose terminal 3 including a display, a speaker, a touch panel, and an operation button is disposed in the steering section 20. The general-purpose terminal 3 provides information to a driver and receives information from the driver.

A satellite positioning module 80 configured as a global navigation satellite system (GNSS) module is provided in a cabin 21 of the tractor. As a component of the satellite positioning module 80, a satellite antenna receiving a GNSS signal (including a GPS signal) is attached at a ceiling area of the cabin 21. A combination of the satellite positioning module 80 and an inertial navigation module incorporated with a gyro acceleration sensor and a magnetic azimuth sensor can complement satellite navigation. The inertial navigation module may be provided separately from the satellite positioning module 80. The vehicle body 1 further includes a plurality of imaging cameras 85 that capture images around the vehicle body 1 during the traveling work and an obstacle sensor 86 that detects obstacles present in a surrounding area of the vehicle body 1.

Figure 3:
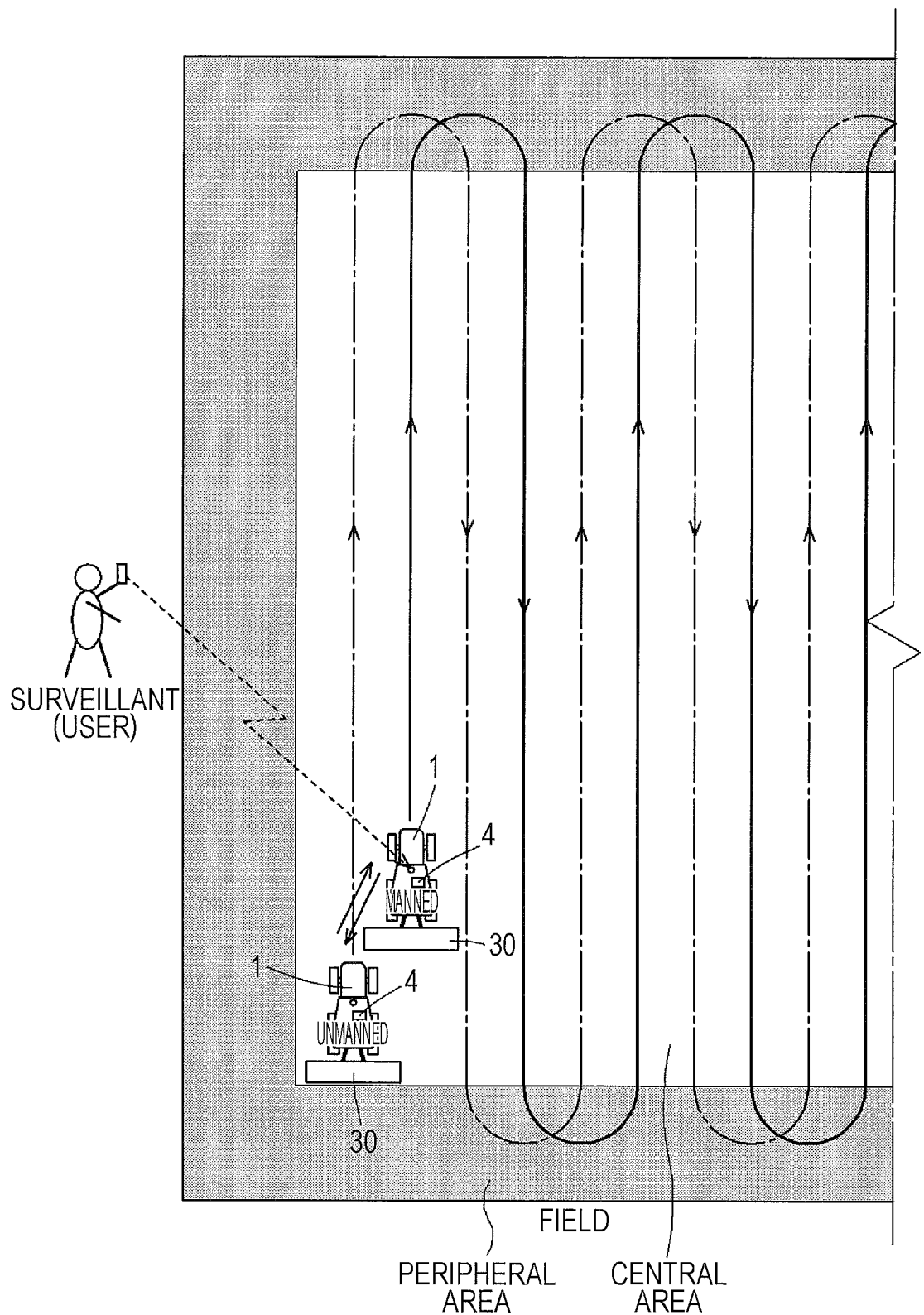
FIG. 3 is a schematic diagram illustrating an example of a work vehicle wireless management system including a manned work vehicle, an unmanned work vehicle, and a remote control device.

FIG. 3 illustrates a state in which the field is tilled by a manned work vehicle on which a driver (user) gets and that performs manned traveling, and an unmanned work vehicle that performs unmanned traveling. At this point, the manned work vehicle and the unmanned work vehicle are tractors of the substantially same type, and are equipped with the communication unit 4 in FIG. 1. The field is divided into a central area having a substantially rectangular and a peripheral area around the central area. The peripheral area is also called a headland delimited along a ridge. In the central area, the ground work is performed by reciprocating traveling, so that its traveling locus includes a repetition of straight forward traveling and turning (U-turn) traveling and straight returning traveling and turning (U-turn) traveling. The headland is a turning area in the work traveling of a central work field. In the peripheral area, a round work traveling is performed by repetition of straight traveling and turning back traveling in each corner area. Wireless bidirectional communication is conducted between the manned work vehicle and the unmanned work vehicle. The surveillant (user) bringing the remote control device 9 stands on the ridge. The remote control device 9 conducts wireless unidirectional communication with the unmanned work vehicle.

Figure 4:
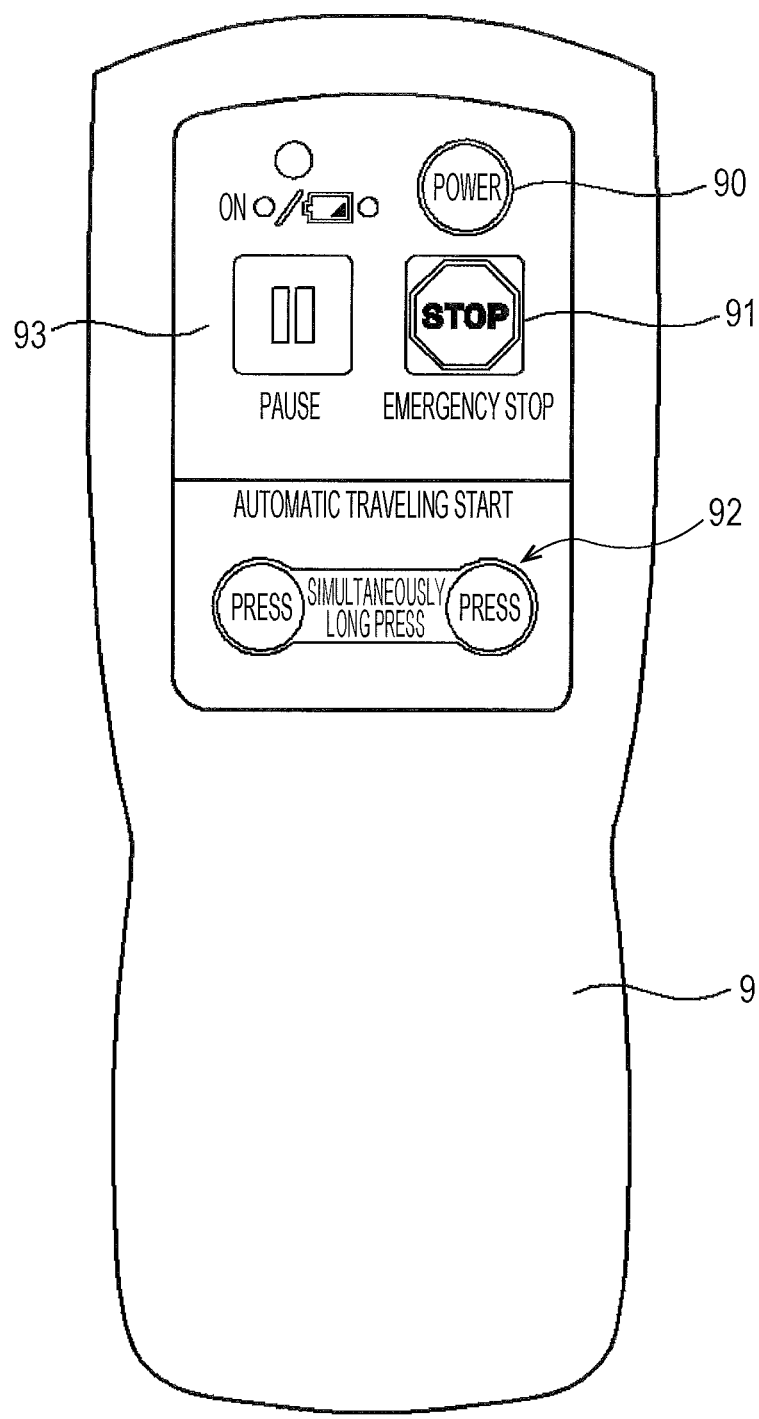
FIG. 4 is a plan view of the remote control device.

FIG. 4 is a plan view of the remote control device 9. The remote control device 9 is a handy type that can be operated by one hand. A power button, an emergency stop button 91, an automatic traveling start button 92, and a pause button 93 are provided in a surface of the remote control device 9. When the emergency stop button 91 is pressed, an emergency stop command is transmitted to the communication unit 4 of the unmanned work vehicle. Similarly, the automatic traveling start command is transmitted when the automatic traveling start button 92 is pressed, and a pause command is transmitted when the pause button 93 is pressed.

In the wireless communication network, wireless communication is conducted between the manned work vehicle and the unmanned work vehicle using two channels of a first in-use frequency band and a second in-use frequency band. The first in-use frequency band is used to transmit image data captured by the imaging camera 95. The second in-use frequency band is used to exchange control information data generated by each of the manned work vehicle and the unmanned work vehicle. The control information data includes a state (such as a vehicle position, an engine speed, and a vehicle speed) of the vehicle body 1 of each work vehicle, a state (such as an operation depth and an orientation) of the work device 30, and a detection result of the obstacle sensor 86.

Figure 5:
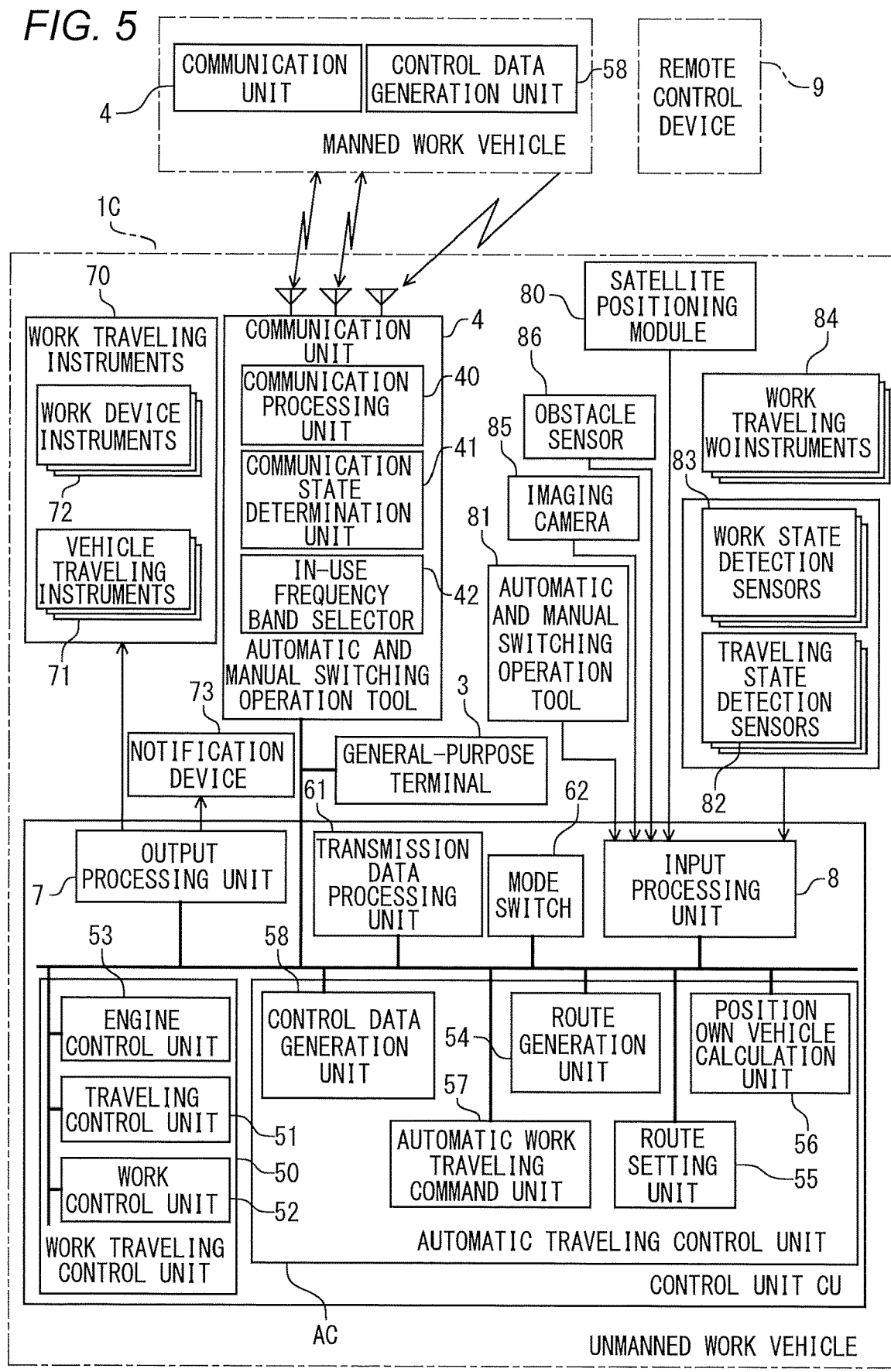
FIG. 5 shows a structure of the unmanned work vehicle.

FIG. 5 show a structure of the unmanned work vehicle. Because the control system of the manned work vehicle is substantially identical to the control system of the unmanned work vehicle, the description of the control system of the unmanned work vehicle can also be used in the description of the control system of the manned work vehicle.

A control unit CU which is a core element of the control system of the unmanned work vehicle includes an output processing unit 7 and an input processing unit 8 as an input and output interface. The communication unit 4 in FIG. 1 is provided in order to exchange wireless data with the outside, and the communication unit 4 is connected to the control unit CU through an in-vehicle LAN. The communication unit 4 may be constructed in the control unit CU. A general-purpose terminal 3 including a graphic user interface is also connected such that movement of the work vehicle can be managed by user's operation. In FIG. 5, the general-purpose terminal 3 is a fixed type connected to the in-vehicle LAN. However, when the general-purpose terminal 3 is configured to exchange the wireless data with the control unit CU through the communication unit 4, the general-purpose terminal 3 can be used while brought out of the vehicle.

The output processing unit 7 is connected to a work traveling instruments 70 including a vehicle traveling instruments 71 and a work device instruments 72 and to a notification device 73 including a lamp, a buzzer, and a speaker. The vehicle traveling instruments 71 includes control devices, such as an engine control device, a gear shift control device, a braking control device, and a steering control device, which are related to the vehicle traveling. In the exemplary embodiment, the work device instruments 72 include a power control device such as a PTO clutch of the work device 30 which is a rotary tilling device, and a raising and lowering cylinder control device of the lifting mechanism 31 that raises and lowers the rotary tilling device.

The input processing unit 8 is connected to a satellite positioning module 80, an automatic and manual switching operation tool 81, traveling state detection sensors 82, work state detection sensors 83, the imaging camera 85, and the obstacle sensor 86. The automatic and manual switching operation tool 81 is a switch that selects either an automatic traveling mode in which the vehicle travels by automatic steering or a manual steering mode in which the vehicle travels by manual steering. For example, the traveling in the automatic steering mode is switched to the traveling in the manual steering mode by operating the automatic and manual switching operation tool 81 during the traveling in the automatic steering mode, and the traveling in the manual steering mode is switched to the traveling in the automatic steering by operating the automatic and manual switching operation tool 81 during the traveling in the manual steering mode. The traveling state detection sensors 82 include a sensor that detects a state of the operation tool (constituent elements of the work traveling operation tool group 84) such as an engine speed adjustment tool, an accelerator pedal, a brake pedal, and the steering wheel 22. The work state detection sensors 83 include a sensor that detects a state of the work operation tool (constituent elements of the work traveling operation tools 84) that adjusts drive and an orientation of the work device 30.

A work traveling control unit 50, an automatic traveling control unit AC, a transmission data processing unit 61, and a mode switch 62 are substantially incorporated in the control unit CU as hardware such as circuitry and a processor. However, the work traveling control unit 50, the automatic traveling control unit AC, the transmission data processing unit 61, and the mode switch 62 may be constructed by software.

The work traveling control unit 50 includes a traveling control unit 51, a work control unit 52, and an engine control unit 53. The traveling control unit 51 controls vehicle traveling instruments 71. Because the tractor is configured to be able to travel both in the automatic traveling (automatic steering) and the manual traveling (manual steering), the traveling control unit 51 has a manual traveling control function and an automatic traveling control function. When the manual traveling control function is performed, the vehicle traveling instruments 71 are controlled based on operation by a driver. When the automatic traveling control function is performed, a steering control signal (a kind of the operation control signal) generated based on an automatic steering command provided from the automatic traveling control unit AC is output to the steering motor 14. In order to control the movement of the work device 30, the work control unit 52 provides a work control signal (a kind of the operation control signal) to the work device instruments 72. The engine control unit 53 provides an engine control signal (a kind of the operation control signal) to an engine operation device.

The automatic traveling control unit AC includes a route generation unit 54, a route setting unit 55, an own vehicle position calculation unit 56, and an automatic work traveling command unit 57.

The route generation unit 54 reads an outline data of the field from the inputted field information, and generates an appropriate traveling route in the field. The generation of the traveling route may be automatically performed based on a basic initial parameter input by the driver, or the traveling route generated by another computer may be downloaded. In any case, the traveling route output from the route generation unit 54 is developed in a memory, and used in the automatic traveling. Even in the manual traveling, as a matter of course, the traveling route can be used in guidance for the work vehicle traveling along the traveling route.

The route setting unit 55 sequentially reads the traveling route developed in the memory, and sets the sequentially-read traveling route to the traveling route as a traveling target. The own vehicle position calculation unit 56 calculates the position of the vehicle body 1 or the position of the work device 30 based on positioning data sequentially sent from the satellite positioning module 80. The automatic work traveling command unit 57 calculates an azimuth deviation and a positional deviation between the target traveling route and the own vehicle position, and issues the automatic steering command to the traveling control unit 51 to eliminate the azimuth deviation and the positional deviation.

The mode switch 62 switches between the manned work vehicle mode in which the work vehicle acts as the manned work vehicle and the unmanned work vehicle mode in which the work vehicle acts as the unmanned work vehicle through a user operation when the plurality of work vehicles perform the work in cooperation with each other. The transmission data processing unit 61 deals with the control information data indicating the work traveling state detected by the traveling state detection sensors 82, the work state detection sensors 83, and the obstacle sensor 86 and the captured image data from the imaging camera 85. The transmission data processing unit 61 converts various pieces of data into an appropriate format in order to obtain wireless transmission data, and converts the transmitted wireless transmission data into a data format that can be internally processed.

Figure 6:
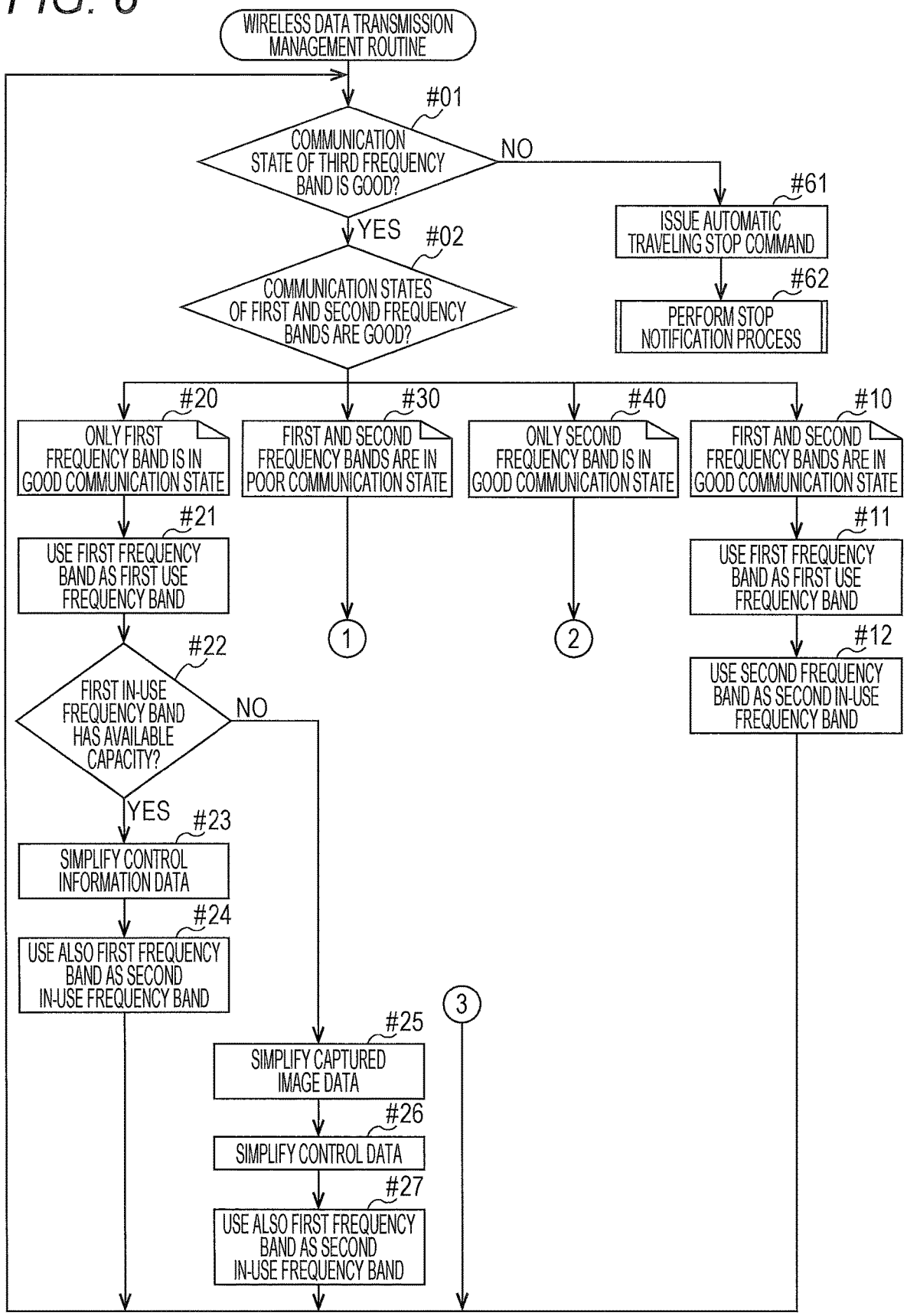
FIG. 6 is a flowchart illustrating an example of a wireless data transmission management routine in the work vehicle wireless management system.
Figure 7:
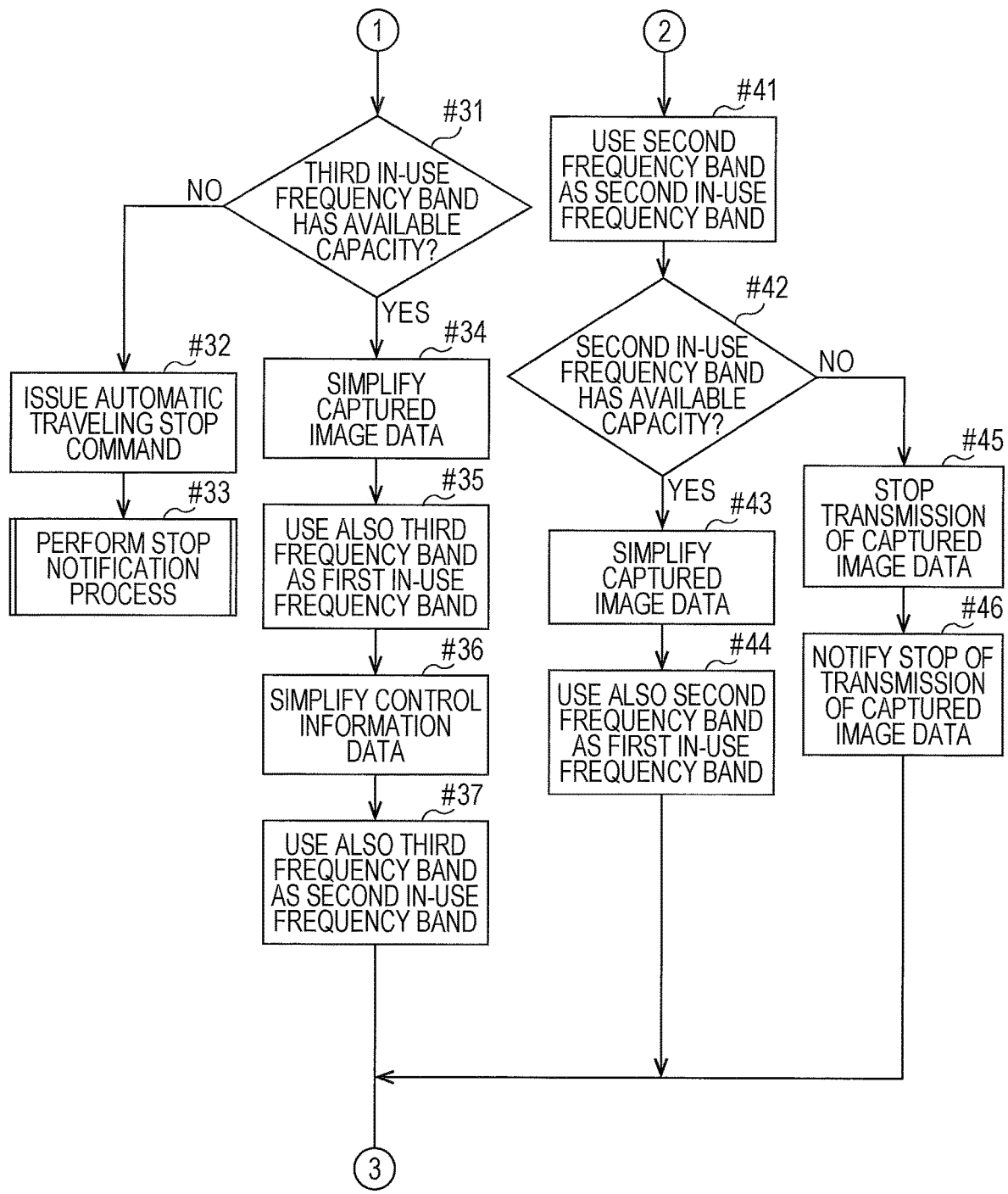
FIG. 7 is a flowchart illustrating an example of the wireless data transmission management routine in the work vehicle wireless management system.

An example of a wireless data transmission management routine in the unmanned work vehicle will be described below with reference to FIGS. 6 and 7.

First, a determination result is fetched from the communication state determination unit 41, and whether the communication state in the third frequency band is good is checked (#01). In a default state, the third frequency band is used in the third in-use frequency band transmitting the emergency stop command from the remote control device 9. Accordingly, when the communication state in the third frequency band is poor (No branch in #01), the transmission data processing unit 61 issues an automatic traveling stop command to the work traveling control unit 50 (#61). Therefore, the unmanned work vehicle stops the automatic traveling. A stop notification process (drive of a lamp or a buzzer) indicating the stop of the automatic traveling is performed (#62).

When the communication state in the third frequency band is good (Yes branch in #01), whether the communication states in the first and second frequency bands are good is further checked (#02). In this check, different processes are performed according to the following four communication states.

(1) In case the first and second frequency bands are in good communication state (#10):

The first frequency band is used as the first in-use frequency band (#11). The second frequency band is used as the second in-use frequency band (#12).

(2) In case only the first frequency band is in the good communication state (#20):

The first frequency band is used as the first in-use frequency band (#21). Therefore, the captured image data is wirelessly transmitted using the first frequency band of a 2.4-GHz band. Further, whether the data transmission of the first in-use frequency band that is the first frequency band has an available capacity is checked (#22). When there is the available capacity for data transmission in the first in-use frequency band (Yes branch in #22), control information data originally intended to be transmitted in the second frequency band is added to the available capacity of the first in-use frequency band (first frequency band). Therefore, the control information data is simplified (a data amount is reduced) to a necessary extent (#23). The control information data is transmitted using the first frequency band. That is, the first frequency band is also used as the second in-use frequency band (#24). When the data transmission in the first in-use frequency band does not have the available capacity (No in #22), the first frequency band is used as the first and second in-use frequency bands, and used in the wireless transmission of both the captured image data and the control information data. For this reason, the captured image data is simplified (the data amount is reduced) to a necessary extent by frame thinning or still image conversion (#25). Similarly, the control information data is also simplified (the data amount is reduced) to a necessary extent (#26). The captured image data and the control information data are transmitted using the first frequency band. That is, the first frequency band is used not only as the first in-use frequency band but also as the second in-use frequency band (#27).

(3) In case the first and second frequency bands are in poor communication state (#30):

Whether the data transmission of the third in-use frequency band which is the third frequency band has the available capacity is checked (#31). When the data transmission in the third in-use frequency band has the available capacity (Yes branch in #31), the captured image data originally intended to be transmitted in the first frequency band and the control information data originally intended to be transmitted in the second frequency band are added to the available capacity of the third in-use frequency band (third frequency band). Because the third frequency band that is the 429-MHz band has the small transmission data amount, the captured image data is simplified to a necessary extent (#34), the third frequency band is also used as the first in-use frequency band, and the simplified captured image data is wirelessly transmitted in the third frequency band (#35). Similarly, the control information data is also simplified to a necessary extent (#36), the third frequency band is also used as the second in-use frequency band, and the simplified control information data is wirelessly transmitted in the third frequency band (#37). When the data transmission in the third in-use frequency band has the available capacity (No branch in #31), the transmission data processing unit 61 issues an automatic traveling stop command to the work traveling control unit 50 (#32). Therefore, the unmanned work vehicle stops the automatic traveling. The stop notification process (drive of a lamp or a buzzer) indicating the stop of the automatic traveling is performed (#33).

(4) In case only the second frequency band is in good communication state (#40):

The second frequency band is used as the second in-use frequency band (#41). Therefore, the control information data is wirelessly transmitted using the second frequency band of a 920-GHz band. Further, whether there is an available capacity for data transmission of the second in-use frequency band that is the second frequency band is checked (#42). When there is the available capacity for data transmission in the second in-use frequency band (Yes branch in #42), captured image data originally intended to be transmitted in the first frequency band is added to the available capacity of the second in-use frequency band (second frequency band). Therefore, the captured image data is simplified (a data amount is reduced) to a necessary extent (#43). The captured image data is transmitted using the second frequency band. That is, the second frequency band is also used as the first in-use frequency band (#44). When the data transmission in the second in-use frequency band does not have the available capacity (No branch in #42), the wireless transmission of the captured image data is stopped (#45), and the stop of transmission of the captured image data is notified (#46).

Other Exemplary Embodiments (1) In the above exemplary embodiment, the three frequency bands are used. However, at least four frequency bands can be used.

(2) In the above exemplary embodiment, the remote control device 9 is used as a simple signal transmitter that performs unidirectional wireless communication. Alternatively, a high-functioning communication terminal such as a tablet computer may be used as the remote control device 9. In this case, bidirectional wireless communication can be conducted between the remote control device 9 and the work vehicle, and the captured image data can be displayed on a touch panel of the communication terminal that is the remote control device 9, for example.

(3) Each unit (circuitry or a processor) shown in FIG. 5 is mainly separated for the purpose of description. Actually, each unit can be integrated with another unit, or divided into a plurality of sub units. For example, the automatic traveling control unit AC may be constructed in the general-purpose terminal 3.

(4) In the above exemplary embodiment, the manned work vehicle and the unmanned work vehicle are the same type, and the control systems are also substantially the same. However, the manned work vehicle and the unmanned work vehicle may be configured by different types of work vehicles. The manned work vehicle and the unmanned work vehicle may be equipped with the control system necessary only for each of the manned work vehicle and the unmanned work vehicle.

(5) In the above exemplary embodiment, the tractor equipped with the rotary tilling machine as the work device 30 is described as the work vehicle. In addition to the tractor, for example, agricultural work vehicles such as a rice transplanter, a fertilizer, and a combine or various work vehicles such as a construction work vehicle equipped with a dozer and a roller as the work device 30 can also be adopted as an exemplary embodiment. One of the work vehicles may be a vehicle that does not actually perform the work.

The embodiment is applicable to the work vehicle wireless management system that manages the work traveling of the plurality of work vehicles using the wireless communication network.

According to the embodiment, a work vehicle wireless management system that manages work traveling of a plurality of work vehicles using a wireless communication network includes a plurality of communication units to transact wireless transmission data related to the work traveling of the work vehicle. The communication units are configured to perform a communication process on the wireless transmission data using a frequency band selected in accordance with data type of the wireless transmission data from a plurality of different frequency bands as an in-use frequency band.

In the configuration, the wireless transmission data related to the work traveling of the plurality of work vehicles is processed using the frequency band selected in each data type of the wireless transmission data from the plurality of different frequency bands as the in-use frequency band. Therefore, an appropriate frequency band can be used in the wireless transmission of data according to the data type. Because a multi-channel is constructed in the communication of the wireless transmission data by the use of the plurality of frequency bands, an advantage that the amount of wireless transmission data necessary for the work traveling of the work vehicle is appropriately distributed can be obtained.

In an advantageous exemplary embodiment of the present invention, the work vehicle wireless management system further includes: a communication state determination unit to determine communication states of the plurality of different frequency bands; and an frequency band selector to select the frequency band allocated in each of the data type based on the communication state. In the configuration, because the communication state of each of the plurality of frequency bands used as the frequency band is checked, the frequency band in which reception sensitivity is degraded or the frequency band influenced by wireless wave interference can be specified. Therefore, the optimum wireless transmission corresponding to the communication state can be performed by adjusting the purpose of the use of the plurality of frequency band in accordance with the communication states.

In an advantageous exemplary embodiment of the present invention, the plurality of frequency bands include a first frequency band, a second frequency band, and a third frequency band, the first frequency band is higher than the second frequency band, the second frequency band is higher than the third frequency band, the data type includes captured image data regarding surroundings of the work vehicle, control information data related to the traveling work of the work vehicle, and an emergency stop command for emergency stop of the work vehicle, and when all the plurality of frequency bands are in a good state, the first frequency band is used as the frequency band for the captured image data, the second frequency band is used as the frequency band for the control information data, and the third frequency band is used as the frequency band for the transmission of the emergency stop command.

In the wireless transmission of data, a propagation characteristic is degraded as the data transmission amount increases in the high frequency band, and the propagation characteristic becomes better as the data transmission amount decreases in the low frequency band. In consideration of this fact, in the above configuration, the first frequency band having the highest frequency is used for the wireless transmission of the captured image data regarding the surroundings of the work vehicle in which a loss of the transmitted data is not fatal while the data amount is large. The third frequency band having the lowest frequency is used for the wireless transmission of the emergency stop command in which the loss of the transmitted data is fatal while the data amount is small. The second frequency band is used for the wireless transmission of the control information data in which the loss of the transmitted data is not fatal while the data amount is large. Therefore, the frequency band appropriately selected according to the data type necessary for the work traveling of the work vehicle is used in the data transmission.

In order to securely perform the work using the plurality of work vehicles as desired, it is necessary for a driver who gets on the manned work vehicle to monitor the automatic operation of the unmanned work vehicle. Because the movement of the unmanned work vehicle may enter a blind spot of the driver of the manned work vehicle, or the driver of the manned work vehicle may miss the unexpected movement of the unmanned work vehicle, it is also necessary for a surveillant who stands at the work field to monitor the movement of the unmanned work vehicle to perform the emergency stop of the unmanned work vehicle using the remote control device in order to deal with such the situations. In an advantageous exemplary embodiment of the present invention, the plurality of work vehicles include a manually traveling manned work vehicle and an automatically traveling unmanned work vehicle, and the communication of the captured image data and the transmission of the control information data are performed between the manned work vehicle and the unmanned work vehicle, and the transmission of the emergency stop command is performed between a remote control device operated by a user who is out of the work vehicle and the unmanned work vehicle.

In an advantageous exemplary embodiment of the present invention, when an available capacity of a data transmission capacity is generated in at least one of the frequency bands, duplicate transmission of at least a part of a data content in at least one of the data types is performed using the frequency band in which the data transmission capacity has the available capacity. In the configuration, when the frequency band allocated according to the data type has an idle channel, at least part of the data of another data type, preferably important data is wirelessly transmitted using this idle channel. This improves communication reliability of the wireless transmission.

In an advantageous exemplary embodiment of the present invention, when at least one of the plurality of frequency bands is determined to be poor, and when at least one of the plurality of frequency bands is determined to be good, at least a part of the wireless transmission data of the data type transmitted using the frequency band to which the frequency band determined to be poor is allocated is transmitted by the frequency band that is the frequency band determined to be good. In the configuration, when a decrease in reception sensitivity or wireless interference is generated in a specific frequency band, at least a part of the wireless transmission data of the data type in which the specific frequency band is allocated as the frequency band can be wirelessly transmitted while breaking in another frequency band having the good communication state, so that the minimum communication reliability of the wireless transmission can be secured.

When the unmanned work vehicle automatically travels while being connected by a wireless communication network, depending on the state of the work field and the type of work, the work traveling must be avoided even in a state in which a part of the wireless communication network is blocked. Therefore, in an advantageous exemplary embodiment of the present invention, when at least one of the plurality of frequency bands is determined to be poor, the unmanned work vehicle is forcedly stopped.

In an advantageous exemplary embodiment of the present invention, the communication state determination unit is configured to determine the communication state by a reception signal intensity, a beacon signal check, or both. In the configuration in which the communication state is determined only by the reception signal intensity, necessary circuits and programs are simple, which is advantageous from the viewpoint of cost. Because the configuration in which the communication state is determined by a beacon signal check involves transmission and reception of actual data (beacon signal), the determination of the communication state is more reliable. In the configuration in which the communication state is determined by both the reception signal intensity and the beacon signal check, it is easy to pursue a failure cause of the communication state, so that an appropriate measure can be taken when the poor communication state is generated.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless management system for work vehicles, comprising:
   a first communication device configured to perform wireless communication in frequency bands to control the work vehicles; and
   a second communication device configured to perform the wireless communication with the first communication device, the first communication device and the second communication device being configured to select a frequency band from the frequency bands based on wireless transmission data in order to perform the wireless communication for the wireless transmission data in the frequency band,
   wherein the frequency bands include a first frequency band, a second frequency band, and a third frequency band, the first frequency band is higher than the second frequency band, and the second frequency band is higher than the third frequency band, wherein the wireless transmission data include captured image data regarding surroundings of at least one of the work vehicles, control information data related to traveling work of at least one of the work vehicles, and an emergency stop command for emergency stop of at least one of the work vehicles, and wherein the first frequency band is used as the frequency band for the captured image data, the second frequency band is used as the frequency band for the control information data, and the third frequency band is used as the frequency band for transmission of the emergency stop command when the frequency bands are in a good state.

2. The wireless management system according to claim 1, wherein at least one of the first communication device and the second communication device comprising:

communication state determination circuitry configured to determine communication states of the frequency bands; and frequency band selecting circuitry configured to select the frequency band based on the wireless transmission data and the communication states.

3. The wireless management system according to claim 1, wherein the work vehicles include a manually traveling manned work vehicle and an automatically traveling unmanned work vehicle, wherein the wireless communication of the captured image data and the control information data are performed between the manually traveling manned work vehicle and the automatically traveling unmanned work vehicle, and wherein the emergency stop command is transmitted from a remote control device to at least one of the first communication device and the second communication device.

4. The wireless management system according to claim 1, wherein duplicate transmission of at least a part of the wireless transmission data is performed using the frequency band and an additional frequency band if the additional frequency band of the frequency bands has an available capacity of a data transmission capacity.

5. The wireless management system according to claim 1, wherein when at least one of the frequency bands is determined to be poor, and when at least one of the frequency bands is determined to be good, at least a part of the wireless transmission data of a data type transmitted using the frequency band to which the frequency band determined to be poor is allocated is transmitted by the frequency band that is the frequency band determined to be good.

6. The wireless management system according to claim 3, wherein when at least one of the frequency bands is determined to be poor, the automatically traveling unmanned work vehicle is forcedly stopped.

7. The wireless management system according to claim 2, wherein the communication state determination circuitry is configured to determine the communication states by at least one of a reception signal intensity and a beacon signal check.

8. A wireless management system for work vehicles, comprising:

first communication means for performing wireless communication in frequency bands to control the work vehicles; and second communication means for performing the wireless communication with the first communication means, the first communication means and the second communication means being configured to select a frequency band from the frequency bands in accordance with wireless transmission data in order to perform the wireless communication for the wireless transmission data in the frequency band, wherein the frequency bands include a first frequency band, a second frequency band, and a third frequency band, the first frequency band is higher than the second frequency band, and the second frequency band is higher than the third frequency band, wherein the wireless transmission data include captured image data regarding surroundings of at least one of the work vehicles, control information data related to traveling work of at least one of the work vehicles, and an emergency stop command for emergency stop of at least one of the work vehicles, and wherein the first frequency band is used as the frequency band for the captured image data, the second frequency band is used as the frequency band for the control information data, and the third frequency band is used as the frequency band for transmission of the emergency stop command when the frequency bands are in a good state.

9. A method for managing work vehicles in a wireless management system, the method comprising:

performing wireless communication in frequency bands to control the work vehicles; and selecting a frequency band from the frequency bands in accordance with wireless transmission data in order to perform the wireless communication for the wireless transmission data in the frequency band, wherein the frequency bands include a first frequency band, a second frequency band, and a third frequency band, the first frequency band is higher than the second frequency band, and the second frequency band is higher than the third frequency band, wherein the wireless transmission data include captured image data regarding surroundings of at least one of the work vehicles, control information data related to traveling work of at least one of the work vehicles, and an emergency stop command for emergency stop of at least one of the work vehicles, and wherein the first frequency band is used as the frequency band for the captured image data, the second frequency band is used as the frequency band for the control information data, and the third frequency band is used as the frequency band for transmission of the emergency stop command when the frequency bands are in a good state.

* * * * *